United States Patent
Takahashi et al.

[15] 3,673,279
[45] June 27, 1972

[54] THERMOPLASTIC RESIN HAVING HIGH IMPACT STRENGTH

[72] Inventors: Akira Takahashi; Hiroo Kojima; Masao Ogawa, all of Tokyo; Hiroshi Osuka, Kanagawa-ken; Shoichi Kobayashi, Tokyo, all of Japan

[73] Assignee: Showa Denka Kabushiki Kaisha, Tokyo, Japan

[22] Filed: Nov. 22, 1968

[21] Appl. No.: 784,517

Related U.S. Application Data

[63] Continuation-in-part of Ser. No. 339,899, Jan. 24, 1964.

[52] U.S. Cl. ............260/876 R, 204/159.17, 260/878 R
[51] Int. Cl. .................................C08f 29/24, C08f 19/04
[58] Field of Search ..............260/876, 878; 204/159.17

[56] References Cited

UNITED STATES PATENTS

| | | |
|---|---|---|
| 3,143,521 | 8/1964 | Thompson et al. ............204/159.17 X |
| 3,158,665 | 11/1964 | Herbig et al. ..........................260/897 |
| 3,268,623 | 8/1966 | Beer ...................................260/878 X |
| 3,298,942 | 1/1967 | Magar et al.........................260/877 X |

Primary Examiner—Murray Tillman
Assistant Examiner—H. Roberts
Attorney—Sherman and Shalloway

[57] ABSTRACT

A thermoplastic resin having high impact strength and a process for producing such thermoplastic resin, the thermoplastic resin being obtained by polymerizing a homogeneous mixture comprising, (a) chlorinated polyethylene; (b) acrilonitrile; and (c) styrene. Also, a thermoplastic resin composition having a high impact strength comprising the thermoplastic resin set forth above in admixture with a polyvinyl chloride resin and optionally a minor amount of polymethylmethacrylate.

2 Claims, No Drawings

THERMOPLASTIC RESIN HAVING HIGH IMPACT STRENGTH

This application is a continuation-in-part of copending application, Ser. No. 339,899, filed Jan. 24, 1964.

The present invention relates to a thermoplastic resin obtained by reacting under polymerizing conditions chlorinated polyethylene with a mixture consisting of acrylonitrile and styrene, and to a process for preparing the same, said resin not only having high tensile as well as impact strength but excelling in flame resistance, weatherability, processability and dimensional stability, as well. Further, the present invention also relates to the usage of the foregoing resin by blending it with polyvinyl chloride to obtain a thermoplastic resin composition having excellent physical properties.

Heretofore, as thermoplastic three-component polymeric compositions, there are known, for example, what are generally referred to as the ABS polymers, which are either copolymers or polymeric or copolymeric mixtures consisting of acrylonitrile, styrene and butadiene. These are prepared by using as the rubber component polybutadiene, butadiene-acrylonitrile copolymer (NBR), the butadiene-styrene copolymer (SBR), natural rubber and the like, and either grafting thereto in the form of a homopolymer or copolymer between acrylonitrile and styrene, or blending therewith acrylonitrile and styrene which have been homopolymerized or copolymerized in advance. While these ABS polymers and the other three-component polymeric composition of the same class are all comparatively good in their impact strength and dimensional stability, their flame resistance, resistance to burning, weatherability and processability are however not yet quite satisfactory. Moreover, they are all either yellow or yellowish brown in color.

It is the object of this invention to eliminate these shortcomings that the conventional three-component polymers have with respect to their properties and to provide a resin which is greatly improved in these properties, and also a process by which this resin is prepared.

The foregoing object of the invention is accomplished by polymerizing a homogeneous mixture comprising (a) chlorinated polyethylene, (b) acrylonitrile and (c) styrene, the composition of which mixture is 10 – 80 percent by weight of (a) and 20 – 90 percent by weight of (b) + (c); and thereafter obtaining the solid polymer by separation.

If explained in greater detail, a chlorinated polyethylene having a degree of chlorination of 10 – 50 percent by weight, preferably 20 – 40 percent by weight is blended homogeneously with a mixture consisting of acrylonitrile and styrene after first having dissolved the former in an non-polymerizable organic solvent or without using a solvent at all. The weight ratio of the acrylonitrile to the styrene can be in the range of between 10:90 and 90:10.

When the degree of chlorination of the chlorinated polyethylene does not exceed 10 percent, since properties intermediate of those of rubber and plastics are exhibited and rubberlike properties not being manifested, the hoped-for excellent properties cannot be imparted to the resin as contemplated by this invention. And also, if the chlorine content of the chlorinated polyethylene is insufficient, its compatibility with other resinous polymerized matter decreases, with the consequence that it is undesirable from the standpoint of the operation of blending the chlorinated polyethylene with other resinous polymerized matter. When the degree of chlorination exceeds 50 percent, however, the rubberlike properties of the chlorinated polyethylene suffer and hence it becomes not fit for use in the present invention.

As the non-polymerizable organic solvents which can be used either singly or in combination, there are included, for example, the halogenated aliphatic hydrocarbons such as chloroform, carbon tetrachloride, monofluorotrichloromethane, dichloroethanes and trichloroethanes; the halogenated aromatic hydrocarbons such as the chlorobenzenes; the aromatic hydrocarbons such as toluene and benzene; and others which can easily dissolve the chlorinated polyethylene.

The form which the homogeneous mixture mentioned above can take includes any and all forms that are sufficient for setting up a uniform reaction; namely, it may be a state in which the chlorinated polyethylene and the monomers are in a mutually dissolved state, or a state in which the chlorinated polyethylene and the monomers are either in solution in a solvent, in a swelled state, in a colloidal state or in a state of dispersion as fine particles in water.

Next, the polymerization reaction is carried out either by heating this homogeneous mixture in the presence of a catalytic amount of a polymerization catalyst or by subjecting it to the irradiation of ionizing rays. As the polymerization catalysts suitably used are the well-known radical-forming polymerization catalysts such as, for example, benzoyl peroxide and azobisisobutyronitrile. As the ionizing radiation, any of the radiating rays such as, for example, X-rays, gamma rays, electron rays, proton rays, deuteron rays, alpha rays, neutron rays, fission fragments, etc. may be applied.

When using a catalyst, the reaction temperature can be suitably selected in accordance with the type of catalyst. In a grafting reaction, generally an enhancement in the grafting efficiency can be expected as the reaction temperature rises. However, on the other hand, since there is a possibility of inducing a reduction in the molecular weight of the polymer by an increase in the transfer reaction, the selection of the reaction temperature is of importance. The temperature to be employed when using a catalyst ranges between 40° and 150° C. Usually preferred is a temperature of 50° – 100° C.

When using radiating rays, the reaction can be carried out satisfactorily by an irradiation in which the dose is $10^4 - 10^7$ rad and the dose rate is $10^2 - 10^6$ rad/hr with the temperature ranging between room temperature and 60° C. The reaction can be likewise carried out using ultraviolet rays.

The solvent used not only has the function of merely effecting the uniform contact of the chlorinated polyethylene and monomers but has some bearing on the properties of the product. For example, when benzene or toluene is used as the solvent, the chain of the acrylonitrile-styrene copolymer in the product is not shortened; whereas when a chain transfer agent such as chloroform, carbon tetrachloride and monofluoro trichloromethane is used as a solvent, it becomes short. Further, as chloroform is abstracted of its hydrogen by means of the polymerization catalyst to readily become a trichloromethyl radical, which in turn abstracts hydrogen from the polymer, chloroform is conveniently used as the solvent when an enhancement in the graft efficiency is contemplated.

The time required for the polymerization reaction is usually from several hours to about 20 hours when a catalyst is used, and on the other hand, usually 20 – 70 hours when ionizing rays are used.

After completion of the reaction, the intended resin is separated and obtained as a solid from the reaction product. The separation is carried out by customary procedures. For example, the liquid reaction product is poured into methanol to precipitate the polymer, after which the solid is separated from the liquid and then dried.

While the composition of the resin obtained as above cannot be fully clarified by the testing methods known up to the present, it is presumed, when considered from the species of reactants used and the reaction conditions adopted, to be a mixed composition consisting of chlorinated polyethylene, a copolymer of acrylonitrile with styrene and a graft copolymer of chlorinated polyethylene and a small amount of the homopolymers of each of the monomers used. Further, it is definite that the composition varies with the proportion in which the reactants are used and the conditions of the reaction employed, and that accordingly the properties of the resin vary to some extent. The properties, however, which can be said to be common to all are that the excellent rubberlike properties of the chlorinated polyethylene are manifested conspicuously, that the weatherability (resistances to ozone and ultraviolet rays) is good which is ascribable to the fact that the chlorinated polyethylene molecule does not contain double bonds as in the case of PBR (polybutadiene rubber), NBR, SBR and natural rubber, that its processability is excellent, it being possible to process it readily at far lower temperatures than the other known resins of this type, that its dimensional stability is great, and further that its flame resistance is greatly superior to the conventional resins of this type owing to its chemical structure which contains chlorine. For example, when two examples of the resin according to the present invention are compared with respect to their flame resistance with "Cycolac" (ABS polymer-Marbon Chemicals Co.), a marked enhancement in the flame resistance is observed as shown in the following table.

| Sample | Content of Chlorinated Polyethylene (%) | Burning Speed* (sec) |
| --- | --- | --- |
| Resin According to this invention | 20.4 | 117 |
| " | 27.8 | 135 |
| "Cycolac" (T) | | 64 |
| "Cycolac" (H) | | 58 |

* Tested in accordance with ASTM–D635–56.

The resin according to this invention not only has an exceedingly high impact strength, but its tensile strength is also considerably high. The extent of these strengths is infuluenced by the magnitude of the content of the chlorinated polyethylene component, however. In general, as the content of the chlorinated polyethylene becomes higher, the impact strength increases along with the modulus of elasticity and elongation, while the tensile strength gradually declines.

While the ratio of the polymerizable monomers can be any effective to provide the advantageous products of the present invention, the acrylonitrile and styrene are generally employed in a weight ratio of 90:10 to 10:90 and preferably a ratio of 80:20 to 20:80.

Another feature of the invention resides in the point that the shaped articles made from the resin obtained according to this invention have a color that is generally lighter than the conventional articles.

In view of the fact that the resin according to this invention possesses these many advantages and features, its application to a wide range of uses can be expected. Particularly, the fact that it excels in weatherability and flame resistance opens new uses for it as a building or furniture material, which hitherto could not have been conceivable.

Besides the various properties as described above, the resin according to this invention also excels in its compatibility with other thermoplastic resins. Thus its use as a compound with the other resins can also be expected. We found that an excellent thermoplastic resin composition possessing a high degree of impact strength and flame resistance could be provided by blending the resin of present invention with particularly the polyvinyl chloride resin or by blending therewith further a small amount of polymethylmethacrylate. A detail description of such a resin composition is given below. uses Heretofore, a composition comprising an ABS polymer and polyvinyl chloride is known. However, as compared with this composition, a composition comprising the resin of present invention and polyvinyl chloride is much superior in its impact strength and moreover it is also much better with respect to its processability. This is ascribable to the fact that the resin of present invention is better than the ABS polymer in its compatibility with polyvinyl chloride which is presumed to be due to the fact that the former is structurally more similar to polyvinyl chloride than the latter. The flame resistance and the other properties possessed by this resin composition as well as the use s that are expected for it are substantially the same as that already mentioned for the resin of present invention.

While the polyvinyl chloride to be blended is principally a rigid polyvinyl chloride having a degree of polymerization of 500 – 2,000, in those case in which pliability is required, it is also possible to use a copolymer of vinyl chloride with not more than 15 percent of vinyl acetate or other vinyl monomers; or in the case it is contemplated to enhance particularly the product's resistance to chemicals and flame, a copolymer of vinyl chloride with vinylidene chloride can be used.

The amount of polyvinylchloride in the mixed resin composition is in the range of between 90 and 20 percent by weight. When the amount of polyvinylchoride is above 90 percent, the impact strength of the mixed resin composition is insufficient. On the other hand, when the amount of polyvinylchloride is below 20 percent, the mixed resin composition is not self-extinguishing.

Further, by adding a small quantity, for instance, 5 – 30 parts by weight, of polymethylmethacrylate to 100 parts by weight of the mixed composition of the resin of present invention and polyvinyl chloride it becomes possible to enhance the surface abrasion resistance, surface luster, tensile strength and weatherability of the product. The addition of the polymethylmethacrylate in an amount exceeding 30 parts by weight should be avoided however, since a decline in the impact strength takes place. The polymethylmethacrylate added is preferably one having a degree of polymerization of the order of about 1,000.

In blending these various components, customary procedures can be followed. For example, the resin of present invention and the powdered or pelletized polyvinyl chloride can be mixed homogeneously by means of heated rolls, a Banbury mixer, an extrusion molder, etc. Alternatively, a suspension, emulsion or solution of the polyvinyl chloride can be directly mixed with a suspension, emulsion or solution of the resin of present invention, after which the solvent is removed and the mixture dried to obtain the mixed composition in powdered form.

It is also possible to add during the mixing, in customary manner, stabilizers and antioxidants of polyvinyl chloride or antioxidants of the resin of present invention and, if necessary, the various fillers, lubricants, coloring agents, plasticizers, etc.

For a clearer understanding, the following specific examples are given. Unless otherwise specified, all parts and percentages are on a weight basis.

EXAMPLE 1

An ampoule is charged with 2 parts of chlorinated polyethylene (degree of chlorination 34 percent), 2.5 parts of acrylonitrile, 7.5 parts of styrene, 20 parts of chloroform and 0.18 part of benzoyl peroxide. The monomers and solvents are frozen, the system is evacuated twice for 5 minutes at $10^{-2}$ mm Hg, and the ampoule is melt-sealed. Then by means of application of heat the chlorinated polyethylene is completely dissolved. After heating this ampoule at 60° C. for 16 hours, it is cooled. The liquid content is then poured into methanol to precipitate a polymer as a solid, which is isolated from the unreacted substances and solvents and dried in vacuum at 50° C.

The resulting product was a yellowish white, opaque resin, and the conversion (percentage consumed in the polymerization reaction) of the monomeric mixture of acrylonitrile and styrene was 72.4 percent. Hence, it is seen this product is a resin containing 21 percent of the chlorinated polyethylene component.

After putting this product through mixing rolls, a specimen used for testing its properties are molded using a heated press. Then a tensile test was conducted in accordance with ASTM–D638–61T. When a pulling speed of 5 mm/min was used, the tensile strength was 3.5 kg/mm², the elongation at break was 84 percent and the modulus of elasticity was 137 kg/mm².

On the other hand, in the flammability test in accordance with ASTM–D635–56, where as the burning speed between the marked lines in the case of "Cycolac" was 57 – 60 seconds, in the case of this product, a value of 117 seconds was shown.

EXAMPLE 2

Five parts of chlorinated polyethylene (degree of chlorination 34 percent), 7.5 parts of acrylonitrile, 12.5 parts of styrene, 20 parts of chloroform and 0.06 part of benzoyl peroxide are reacted for 6 hours at 100° C. The conversion in this case of the monomeric mixture of acrylonitrile and styrene was 73.9 percent. This product was a white, opaque polymer containing 25.4 percent of chlorinated polyethylene. The test specimen obtained by molding as in Example 1 had a tensile strength of 4.1 kg/mm$^2$ at a pulling speed of 50 mm/min and an impact strength of 3.4 kg-cm/cm as measured by means of the Dynstat.

EXAMPLES 3 – 6

The procedures in carrying out each of these examples are as described below. The properties of the polymers obtained are summarized in Table I shown hereinafter, the properties of two examples of the ABS type resin being presented together by way of comparison.

EXAMPLE 3

In a mixture consisting of 60 parts of acrylonitrile, 180 parts of styrene and 480 parts of chloroform is dissolved 72 parts of chlorinated polyethylene having a degree of chlorination of 40.1 percent, following which 0.5 g of benzoyl peroxide is added and then the mixture is heated for 6 hours at 100° C. The conversion of the monomeric mixture of acrylonitrile and styrene in this instance was 59 percent. Hence, the resulting polymer contains 33.8 percent of chlorinated polyethylene.

EXAMPLE 4

In a mixture consisting of 7.5 parts of acrylonitrile, 12.5 parts of styrene and 20 parts of chloroform is dissolved 4 parts of chlorinated polyethylene having a degree of chlorination of 39.3 percent. Then, after adding 0.06 part of benzoyl peroxide, the mixture is heated for 6 hours at 100° C. The conversion of the monomeric mixture of acrylonitrile and styrene in this instance was 74.9 percent. Hence, the resulting polymer contains 21.2 percent of chlorinated polyethylene.

EXAMPLE 5

In a mixture consisting of 5 parts of acrylonitrile, 15 parts of styrene and 20 parts of ethylene dichloride is dissolved 5 parts of chlorinated polyethylene having a degree of chlorination of 38.2 percent. Then, after adding 0.06 parts of benzoyl peroxide to this mixture and further, as a stabilizer 0.15 part of dibutyl tin dimaleate, it is heated for 12 hours at 100° C. The conversion of the acrylonitrile and styrene monomers in this instance was 82.5 percent. Hence, the resulting polymer contains 23.3 percent of chlorinated polyethylene.

EXAMPLE 6

In a mixture consisting of 7.5 parts of acrylonitrile, 12.5 parts of styrene and 20 parts of chloroform is dissolved 5 parts of chlorinated polyethylene having a degree of chlorination of 36.4 percent, following which 0.06 part of benzoyl peroxide is added to the mixture, which is then heated for 6 hours at 100° C. The conversion of the acrylonitrile and styrene monomers in this instance was 73.9 percent. Hence, the resulting polymer contains 25.4 percent of chlorinated polyethylene.

EXAMPLE 7

Example 1 is repeated except that instead of the benzoyl peroxide 0.06 part of azobisisobutyronitrile is used as the polymerization catalyst.

The resulting product was white and semitransparent, and the conversion of the monomeric mixture of acrylonitrile and styrene was 83.4 percent. Hence this resin contains 19.4 percent of the chlorinated polyethylene component. The test specimen obtained by molding as in Example 1 exhibited, at a pulling speed of 5 mm/min, a tensile strength of 3.4 kg/mm$^2$, an elongation at break of 33 percent and a modulus of elasticity of 160 kg/mm$^2$,

EXAMPLE 8

Excepting that 20 parts of toluene is used as the solvent, otherwise the same procedures as described in Example 7 are followed.

A white, semitransparent resin containing 20 percent of the chlorinated polyethylene component was obtained at a conversion of 79.9 percent for the monomeric mixture of acrylonitrile and styrene.

The test specimen obtained by molding as in Example 1 had, at a pulling speed of 5 mm/min, a tensile strength of 4.2 kg/mm$^2$, an elongation at break of 30 percent and a modulus of elasticity of 136 kg/mm$^2$.

EXAMPLE 9

Example 8 is repeated except that benzene is used as the solvent instead of the toluene.

The resulting product was white and opaque, and the conversion of the monomeric mixture of acrylonitrile and styrene was 68.5 percent. Hence, this is a resin containing 22.6 percent of the chlorinated polyethylene component. The test specimen obtained by molding as in Example 1 had, at a pulling speed of 5 mm/min, a tensile strength of 3.3 kg/mm$^2$, an elongation at break of 26 percent and a modulus of elasticity of 250 kg/mm$^2$.

EXAMPLE 10

The same procedures as described in Example 1 are followed, except that the reaction is carried out for 6 hours using benzoyl peroxide in an amount of 0.12 part as the catalyst and without using a solvent. The reaction mixture which at first is a liquid becomes a viscous solid as the reaction proceeds.

The resulting product was brown and opaque, and the conversion of the monomeric mixture of acrylonitrile and styrene was 72 percent. The test specimen obtained by molding this product as in Example 1 exhibited a tensile strength of 3 kg/mm$^2$ at pulling speed of 50 mm/min.

EXAMPLE 11

The same procedures as described in Example 1 are followed, except that the benzoyl peroxide is used in an amount of 0.06 part and the reaction time of 8 hours is used.

A light yellow, opaque resin containing 36 percent of the chlorinated polyethylene component is obtained. A test specimen obtained by molding this product as in Example 1 had a tensile strength of 2.8 kg/mm$^2$ at a pulling speed of 50 mm/min.

TABLE I

| | Properties | | | | | | | | | |
|---|---|---|---|---|---|---|---|---|---|---|
| | Tensile strength at 50 mm./min., kg./mm.$^2$ | Elongation at 50 mm./min., percent | Impact strength Dynstat, kg.-cm./cm. | Heat distortion Vicat,° C. at— | | Melt index, 21.6 kg., 210° C. | Shore hardness | Tensile strength (elongation) using Weather-O-meter after— | | |
| | | | | 0.5 mm. | 1.0 mm. | | | 80 hrs. | 160 hrs. | 240 hrs. |
| Example: | | | | | | | | | | |
| 3 | 3.0 | 166.0 | 3.5 | 84.9 | 91.0 | 40.0 | | 2.9 (100) | 2.9 (100) | 3.0 (47) |
| 4 | 3.8 | 52.5 | 3.7 | 104.2 | 105.9 | 23.0 | | | | |
| 5 | 4.0 | 32.5 | 3.2 | | | 52.8 | | | | |
| 6 | 4.1 | 35.0 | 3.4 | | | 22.8 | 83 | | | |
| ABS type resin "Cycolac" T | 4.2 | 40 | 3.3 | 101 | 104 | | 78 | | | |
| ABS type resin "Cycolac" H | 3.2 | 50 | 4.7 | 99 | 102 | | | | | |

EXAMPLE 12

The same procedures as described in Example 1 are followed except that the benzoyl peroxide is used in an amount of 0.06 part.

A light yellow, opaque resin containing 24 percent of the chlorinated polyethylene component is formed.

A test specimen obtained by molding this product as in Example 1 had a tensile strength of 3.6 kg/mm$^2$ at a pulling speed of 50 mm/min. On the other hand, when a pulling speed of 5 mm/min was used, the tensile strength was 3.3 kg/mm$^2$, the elongation at break was 260 percent and the modulus of elasticity was 220 kg/mm$^2$,

EXAMPLE 13

Except that a reaction time of 2 hours is used, otherwise the same experiment is carried out as in Example 1. The resulting product, which is an opaque thermoplastic resin containing 67 percent of the chlorinated polyethylene component, had very good pliability and its flame resistance was also excellent.

EXAMPLE 14

Example 1 is repeated, except that the reaction is carried for 8 hours using 4.7 parts of acrylonitrile and 5.3 parts of styrene. The conversion of the monomers was 97.5 percent. Hence, the product contains 17.1 percent of the chlorinated polyethylene component. When a tensile test was conducted on a test specimen molded as in Example 1, its tensile strength was 3.8 kg/mm$^2$ at a pulling speed of 5 mm/min.

EXAMPLE 15

The same procedures as described in Example 1 are followed, except that for the reaction time is used 6 hours and for the quantities of the chlorinated polyethylene, acrylonitrile and styrene are used 3.0, 8.0 and 2.0 parts, respectively. The conversion of the monomers was 92 percent and hence the resulting product, which is a yellow thermoplastic resin, contains 24.6 percent of the chlorinated polyethylene component.

EXAMPLE 16

Except that 6 parts of chlorinated polyethylene, 1 part of acrylonitrile, 3 parts of styrene, 0.36 part of benzoyl peroxide and 60 parts of chloroform are used, otherwise the experiment is carried out as in Example 1. The conversion was 42.5 percent and the chlorinated polyethylene contained in the product was 78 percent.

EXAMPLE 17

An ampoule is charged with 5 parts of chlorinated polyethylene having a degree of chlorination 34 percent, 15 parts of acrylonitrile, 70 parts styrene and 20 parts chloroform. The monomers and the solvent are frozen, and then the system is evaporated for 5 minutes at 10$^{-2}$ mm/Hg following which the system is closed and the contents melted. After repeating this operation twice, the ampoule is melt-sealed. Then, placing the ampoule in a 60° C. bath, it is irradiated with a 4.8 × 10$^5$ rad dose of gamma rays of cobalt–60 at the dose rate of 10$^4$ rad per hour. The contents are then poured into methanol and the polymer is precipitated, following which it is isolated from the unreacted substances and the solvent and is then dried at 50° C., under reduced pressure. The conversion of the monomeric mixture of the acrylonitrile and styrene was 63.3 percent, indicating that this is a three-component resin of chlorinated polyethylene, acrylonitrile and styrene in which the content of the chlorinated polyethylene is 30.6 percent. After putting this product through mixing rolls, it is formed into test specimen using a heated press. The specimen is then submitted to a tensile test in accordance with ASTM D–638–61T. The specimen had a tensile strength of 3.4 kg/mm$^2$ and an elongation at break of 150 percent at a pulling speed of 50 mm/min. This molded product was practically colorless. The burning speed as determined by the flammability test prescribed by ASTM D–635–56 was 144 seconds. A similar test conducted on "Cycolac" (an ABS polymer produced by Marbon Chemicals Company) resulted in a time of 64 seconds.

EXAMPLE 18

Except that the chlorinated polyethylene, acrylonitrile and styrene are used in the amounts of 2, 8 and 2 parts respectively, and the dose used is 2.4 × 10$^5$ rad, otherwise the experiment is carried out as in Example 17. The conversion of the monomeric mixture being 45.4 percent, the resulting product is a three-component resin of chlorinated polyethylene, acrylonitrile and styrene in which the content of the chlorinated polyethylene is 31 percent. The molded product was colorless.

EXAMPLE 19

Except that the chlorinated polyethylene, acrylonitrile and styrene are used in the amounts of 5, 5 and 15 parts, respectively, a solvent is not used, 25° C. is used as the reaction temperature, and as the dose is used 1.2 × 10$^6$ rad at the dose rate of 6 × 10$^4$ rad/hr, otherwise the experiment is carried out as in Example 17. The conversion of the monomeric mixture of acrylonitrile and styrene was 95 percent. Hence, this product is a three-component resin of chlorinated polyethylene, acrylonitrile and styrene in which the content of the chlorinated polyethylene is 20.8 percent. A test specimen obtained by molding this resin as in Example 17 had a tensile strength of 5.5 kg/mm$^2$ at a pulling speed of 500 mm/min. This molded article had a slight yellowish tinge.

EXAMPLE 20

A dispersion is prepared by mixing and stirring a mixture of the following recipe in a 1-liter stainless steel autoclave.

Recipe

| | |
|---|---|
| Chlorinated polyethylene powder (chlorination degree = 30 %) | 24 parts |
| Polyvinyl alcohol | 0.4 part |
| Water | 100 parts |

A mixture of the following recipe is added to the dispersion while stirring at room temperature.

Recipe

| | |
|---|---|
| Acrylonitrile | 20 parts |
| Styrene | 54 parts |
| Tertiary butyl peracetate | 0.2 part |
| Tertiary dodecylmercaptan | 0.2 part |

The resulting aqueous suspension is suspension polymerized under nitrogen atmosphere for 4 hours at 105° C. and for 2 hours at 145° C. The conversion of acrylonitrile and styrene is 97 percent. The resulting polymer is separated from water after cooling, washed with water and then dried. No particulate copolymer consisting of styrene and acrylonitrile alone is observed in the resulting polymer. This means that the reaction has been performed uniformly in the dispersed particles. To the resulting polymer are added 2 parts of dibasic lead phosphite as stabilizer, and then they are mixed together and molded into test pieces. The impact strength measured in accordance with the method described in ASTM D–250–56T was 11.3 ft-lb/in (Izod notched, at room temperature). The melt index under load of 21.6 kg at 210° C. measured in accordance with ASTM D–1238–57T was 40g/10 minutes. The tensile strength measured in accordance with ASTM D–638–58T was 345 kg/cm$^2$.

EXAMPLE 21

The following experiments, Runs 1 to 11, were conducted to illustrate the criticality of the components of the resin in accordance with the present invention.

The measurement methods used in these experiments are as follows:

| | |
|---|---|
| Mooney viscosity: | ASTM-1646-61, $ML_{1+4}$ 100°C. |
| Impact strength: | ASTM D-256-56 (20°C., ⅛ inch thick) |
| Melt index: | ASTM D-1238-57 (210°C., 21 Kg) |

Run 1

Five parts of chlorinated polyethylene having a Mooney viscosity of 30 and a degree of chlorination of 29 percent was dissolved in a mixture consisting of 5 parts of acrylonitrile, 15 parts of styrene and 40 parts of chloroform, benzoyl peroxide (0.04 part) was added to the mixture, and the resulting mixture was heated at 100° C. for 11 hours. The conversion of the monomers was nearly 86 percent. Hence, the resulting grafted polymer contained 23 percent of the chlorinated polyethylene.

Run 2

For the sake of comparison, the procedures of Run 1 were repeated except that acrylonitrile and styrene were polymerized without using chlorinated polyethylene. An acrylonitrile/styrene copolymer was obtained. Seventy-seven parts of the resulting copolymer was mechanically blended with 23 parts of the chlorinated polyethylene used in Run (1) to obtain a resin composition.

Run 3

The procedures of Run (1) were repeated except that chlorosulfonated polyethylene (Hypalon-20) having a Mooney viscosity of 30 and a chlorine content of 29 percent was used in place of the chlorinated polyethylene and the polymerization was effected for 6 hours. A resin containing 23 percent of the chlorosulfonated polyethylene was obtained.

Run 4

Seventy-seven parts of the acrylonitrile/styrene copolymer obtained in Run (2) was mechanically blended with 23 parts of the chlorosulfonated polyethylene used in Run (3) to obtain a resin composition.

The impact strength and melt index of the resins obtained in the above Runs (1) to (4) were measured, and the results are shown in Table II.

TABLE II

| | Chlorinated polyethylene | | Hypalon-20 | |
|---|---|---|---|---|
| Mooney viscosity | 30 | | 30 | |
| Cl % | 29 | | 29 | |
| Content of chlorinated or chlorosulfonated polyethylene (%) | 23 | | 23 | |
| Run No. | 1 (graft) | 2 (blend) | 3 (graft) | 4 (blend) |
| Impact strength, Izod notched (ft-lb/inch) | 7.0 | 2.0 | 6.5 | 0.9 |
| Melt index (g/10 min.) | 65 | 60 | almost 0 | 5 |

Runs 5 to 8 were conducted in the same manner as in Runs 1 to 4 except that chlorinated polyethylene having a Mooney viscosity of 60 and a chlorine content of 34 percent and chlorosulfonated polyethylene (Hypalon-40) having a Mooney viscosity of 55 and a chlorine content of 35 percent were used as starting materials. A grafted polymer (Run 5—present invention) containing 24 percent of the chlorinated polyethylene, a grafted polymer (Run 7) containing 24 percent of the chlorosulfonated polyethylene and a blended polymer (Run 8) were obtained. The impact strength and melt index of these resins, as measured in accordance with the above-mentioned methods, are shown in Table III below.

TABLE III

| | Chlorinated polyethylene | | Hypalon-40 | |
|---|---|---|---|---|
| Mooney viscosity | 60 | | 55 | |
| Cl % | 34 | | 35 | |
| Content of chlorinated polyethylene or chlorosulfonated polyethylene (%) | 24 | | 24 | |
| Run No. | 5 (graft) | 6 (blend) | 7 (graft) | 8 (blend) |
| Impact strength, Izod notched (ft-lb/inch) | 7.0 | 2.4 | 6.0 | 0.8 |
| Melt index (g/10 min.) | 55 | 52 | almost 0 | 4 |

Run 9

A resin composition in accordance with the present invention was prepared by effecting the reaction for 8 hours at a temperature of 100° C. with the use of the same starting ingredients as in Run 5. The resulting grafted polymer contained 27 percent of the chlorinated polyethylene.

Runs 10 and 11

The same procedures as in Run 9 were followed except that the same amount of maleic anhydride was used instead of the acrylonitrile, and the reaction was effected for 6 hours (Run 10) and 20 hours (Run 11). Resin compositions containing 30 percent (Run 10) of the chlorinated polyethylene and 27 percent (Run 11) of the chlorinated polyethylene were obtained.

The properties of the resin compositions in these Runs are shown in Table IV.

TABLE IV

| Run | 9 | 10 | 11 |
|---|---|---|---|
| Content of chlorinated polyethylene (%) | 27 | 30 | 27 |
| Impact strength Izod notched (ft-lb/inch) | 11 | 0.4 | 0.4 |
| Melt Index (g/10 min.) | 43 | 0.4 | 0.7 |

It can be seen from the results shown in the Tables II and III, that the resin compositions obtained in Runs 1 and 5 have a high impact strength and a high melt index. When chlorosulfonated polyethylene is used in place of the chlorinated polyethylene, however, in the present invention, only a resin composition having an extremely low melt index can be obtained.

It can also be seen from the results shown in the Table IV that the resin composition obtained by using maleic anhydride instead of the acrylonitrile ingredient in the resin composition of the present invention has only a very low impact strength and melt index.

EXAMPLE 22

Forty grams of chlorinated polyethylene (degree of chlorination 34 percent by weight), 32 g of acrylonitrile, 108 g of styrene and 3 g of benzoyl peroxide are charged into a 500 cc flask along with 240 cc of chlorobenzene. After replacing the system with nitrogen, the reaction is carried out at 60° C. for 13 hours while effecting the flow of a small amount of nitrogen. After completion of the reaction and cooling, the contents are poured into methanol to precipitate and separate the polymer, which is then dried at 50° C. under reduced pressure. The conversion in this instance was 89 percent. Hence, this reaction product is a three-component resin of chlorinated polyethylene, acrylonitrile and styrene in which the chlorinated polyethylene content is 25 percent.

The mixing of this three-component resin (hereinafter referred to as sample A) and polyvinylchloride is carried out on 8-inch rolls with roll surface temperature of 140° C. and a kneading time of about 10 minutes. The polyvinylchloride used is a powdered rigid polyvinylchloride having an average degree of polymerization of 1,450, while as stabilizers are added 5 parts of dibasic lead phosphite and 2 parts of barium stearate (in both instance on the basis of 100 parts of the polyvinylchloride).

Tests of the tensile strength, elongation, Izod impact strength and flammability were conducted on the foregoing mixture of the three-component resin A and polyvinylchloride with respect to the three cases in which the weight ratios of the kneaded mixture were 80:20, 50:50 and 20:80. By way of comparison, the same tests were conducted on a mixture of ABS polymer ("Cycolac" T) and polyvinylchloride of the same grade kneaded under the same conditions with respect to the three cases in which the weight ratios of the mixtures were likewise 80:20, 50:50 and 20:80, as well as the case in which the polyvinylchloride alone (including the stabilizers) was kneaded. These results are shown together in Table V.

and 20 parts of polymethylmethacrylate to obtain the respective mixed compositions C and D. Tests were conducted for the tensile strength, elongation at break, surface luster and abrasion on the three cases B, C and D, whereby were obtained results shown in Table VI.

TABLE VI

| Sample | Tensile Strength kg/cm² | Elongation at Break % | Surface Luster | Abrasion Test cc/HP-hr |
| --- | --- | --- | --- | --- |
| B | 510 | 65 | 37 | 30 |
| C | 559 | 60 | 48 | 26 |
| D | 598 | 65 | 77 | 16 |

The same procedures were followed in measuring the tensile strength and elongation at break as in Example 22. The sample used for measuring the surface luster indicated in the table was a 1-mm-thick sheet molded by clasping between two sheets of new ferrotype plates and compression molding with a 180° C. press. And the method of measurement used as in accordance with the procedures prescribed by JIS (Japan Industrial Standard)–z–8741, the 60° mirror plane luster being measured using a 60° mirror plane luster meter. In measuring the abrasion a Williams type abrasion tester was used and the measurement time used was 5 minutes. The values indicated are the amount of abrasion (cc) per 1 horsepower per 1 hour, the temperature at the time of measurement being 25° C.

TABLE V

| Sample | Tensile kg./cm.² | Elongation at break, percent | Impact strength (unnotched), ft.-lb./in.² | Flammability |
| --- | --- | --- | --- | --- |
| 80% A plus 20% PVC* | 316 | 100 | 47.5 | Self-extinguished in 60 seconds. |
| 50% A plus 50% PVC | 350 | 90 | 48.2 | Self-extinguished in 10 seconds. |
| 20% A plus 80% PVC | 510 | 60 | 89.6 | Self-extinguished immediately. |
| 80% ABS plus 20% PVC | 470 | 30 | 24.7 | Burned in 90 seconds. |
| 50% ABS plus 50% PVC | 485 | 30 | 19.1 | Self-extinguished in 20 seconds. |
| 20% ABS plus 80% PVC | 526 | 90 | 62.2 | Self-extinguished immediately. |
| PVC | 532 | 120 | 9.3 | Do. |

*PVC = Polyvinylchloride.

In this test the tensile strength and elongation at break were measured on an Instron tensile tester at a cross-head speed of 10 cm/min in a constant temperature room of 20° C., using a sample molded into a 1-mm-thick sheet by compression molding at 180° C. and stamping into Japan Industrial Standard No. 3 dumbbell. The impact strength is the result of a measurement in a constant temperature room of 20° C. in accordance with the method of ASTM–D256–54T, using a sample molded into a 4-mm-thick sheet by compression molding at 180° C. and cutting therefrom an unnotched test piece 12.7 mm width and 62 mm length. The flammability test was conducted in accordance with ASTM–635–56, using a 1.5-mm-thick sheet. As is apparent from Table V, the mixed composition consisting of polyvinylchloride and the three-component resin obtained from chlorinated polyetnylene, acrylonitrile and styrene exhibits a very high impact strength when the weight ratio of this mixed composition of the three-component resin and polyvinylchloride is 20:80. Further, as is shown by the results of flammability test, it can be seen that the three-component resin which when used alone burns up in 140 seconds, becomes self-extinguishable by the mixture therewith of about 20 percent by weight of polyvinylchoride.

EXAMPLE 23

The three-component resin A prepared by the same procedures as described in Example 22, is mixed with polyvinylchloride in a weight ratio of 20:80 and dibasic lead phosphite and barium stearate are incorporated as stabilizers likewise as in the previous example to obtain a mixed composition. To 100 parts of this mixed composition (to be referred to as B) are mixed, using 8-inch rolls at 140° C, 10

As shown in Table VI, it is apparent that an improvement is had in the tensile strength, surface luster and resistance to abrasion by the incorporation of polymethylmethacrylate.

We claim:

1. A thermoplastic resin composition having high impact strength comprising:

A. a thermoplastic resin obtained by polymerizing a homogeneous mixture consisting of (a) chlorinated polyethylene having a degree of chlorination of 10 – 50 percent by weight, (b) acrylonitrile and (c) styrene, the range of weight ratio of said (a) to (b) plus (c) being from 10:90 to 80:20, and the range of weight ratio of said (b) to (c) being from 10:90 to 90:10, and B. a polyvinylchloride resin having a degree of polymerization of 500 – 2,000, said A and B being mechanically blended in a weight ratio of A to B of 10:90 to 80:20.

2. A thermoplastic resin composition having high impact strength comprising:

A. a thermoplastic resin obtained by polymerizing a homogeneous mixture consisting of (a) chlorinated polyethylene having a degree of chlorination of 10 – 50 percent by weight, (b) acrylonitrile and (c) styrene, the range of weight ratio of said (a) to (b) plus (c) being from 10:90 to 80:20, and the range of weight ratio of said (b) to (c) being from 10:90 to 90:10, B. a polyvinylchloride resin having a degree of polymerization of 500 – 2,000, and C. polymethyl methacrylate, said A, B and C being mechanically blended in a weight ratio of A to B of 10:90 to 80:20, and C in an amount of 5 – 30 parts based on 100 parts of combined weight of A and B.

* * * * *